(12) United States Patent
Oh et al.

(10) Patent No.: US 8,700,107 B1
(45) Date of Patent: Apr. 15, 2014

(54) EXPENDABLE AND COLLAPSIBLE SOUND AMPLIFYING CELLULAR PHONE CASE

(71) Applicants: Kwang J. Oh, La Crescenta, CA (US); Loren Oh, Irvine, CA (US); Austin Oh, Azusa, CA (US)

(72) Inventors: Kwang J. Oh, La Crescenta, CA (US); Loren Oh, Irvine, CA (US); Austin Oh, Azusa, CA (US)

( * ) Notice: Subject to any disclaimer, the term of this patent is extended or adjusted under 35 U.S.C. 154(b) by 0 days.

(21) Appl. No.: 13/658,742

(22) Filed: Oct. 23, 2012

(51) Int. Cl.
*H04M 1/00* (2006.01)
*H04K 3/00* (2006.01)

(52) U.S. Cl.
USPC .................................... 455/575.1; 381/322

(58) Field of Classification Search
USPC ............... 455/90.1, 550, 569.1, 575.1, 575.4, 455/575.8; 381/174, 322, 386
See application file for complete search history.

(56) References Cited

U.S. PATENT DOCUMENTS 8,412,289 B1 * 4/2013 Oh ............................. 455/575.1
8,433,377 B1 * 4/2013 Oh et al. .................... 455/575.1

* cited by examiner

*Primary Examiner* — Lee Nguyen
(74) *Attorney, Agent, or Firm* — John K. Park; Park Law Firm

(57) ABSTRACT

A sound-amplifying case for a mobile device is provided. The sound guide groove is provided under a portion of the body and opened over the speaker of the mobile device for guiding sound from the speaker toward the pop-up plate. The sound guide hole is provided through a portion of the base groove of the body exposing the speaker of the mobile device to the sound guide groove. The blockable sound slit is provided between the body and the pop-up plate above the sound guide groove, and the blockable sound slit is configured to open when the pop-up plate is closed down and to close when the pop-up plate is opened up. The wedge-shape bellow sound amplifier comprises first and second foldable pan-shaped plates, and each of them is installed between corresponding side edge of the base groove of the body and corresponding inner edge of the pop-up plate.

20 Claims, 18 Drawing Sheets (a)

(b)

(c)

(a)

(b)

EXPENDABLE AND COLLAPSIBLE SOUND AMPLIFYING CELLULAR PHONE CASE

RELATED APPLICATION

This application is a continuation-in-part of U.S. patent application Ser. No. 13/403,947 for "EXPENDABLE AND COLLAPSIBLE SOUND AMPLIFYING CELLULAR PHONE CASE" filed on Feb. 23, 2012 and U.S. patent application Ser. No. 13/552,539 for "EXPENDABLE AND COLLAPSIBLE SOUND AMPLIFYING CELLULAR PHONE CASE" filed on Jul. 18, 2012.

BACKGROUND OF THE INVENTION

The present invention relates to an expendable and collapsible sound amplifying cellular phone case.

A cellular phone is like a body part to a modern human being. However, cellular phone itself may be too customized to a basic functions by the manufacturers.

A need for an expendable and collapsible sound amplifying cellular phone case has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a sound-amplifying case for a mobile device.

The case is for a mobile device with a front face, a rear face, a top edge, a bottom edge, two side edges, and a speaker.

An aspect of the invention provides a sound-amplifying case for a mobile device.

The body is for covering the rear face of the mobile device and comprises a plurality of fastening portions configured to fasten the mobile device, a plurality of utility holes for exposing portions of the mobile device, and a base groove.

The sound guide groove is provided under a portion of a body edge of the body and opened over the speaker of the mobile device for guiding sound from the speaker toward the pop-up plate.

The sound guide hole is provided through a portion of the base groove of the body exposing the speaker of the mobile device to the sound guide groove.

The pop-up plate with a plate edge is hinged to a portion of the body substantially along the body edge so as to cover the base groove of the body.

The blockable sound slit is provided between the body and the pop-up plate above the sound guide groove, and the blockable sound slit is configured to open when the pop-up plate is closed down and to close when the pop-up plate is opened up.

The wedge-shape bellow sound amplifier comprises first and second foldable pan-shaped plates, and each of them is installed between corresponding side edge of the base groove of the body and corresponding inner edge of the pop-up plate, and each of the first and second foldable pan-shaped plates engages the body through a first hinge and the pop-up plate through a second hinge, wherein each of the first and second foldable pan-shaped plates comprises two sub-plates connected to each other through a third hinge.

The plurality of first magnets are provided in the pop-up plate for attracting and holding the pop-up plate to the body.

The spring device is provided between the pop-up plate and the body, configured for opening the wedge-shaped bellow sound amplifier along with the pop-up plate.

The plurality of first magnets and the spring device are configured such that the pop-up plate is kept closed when the pop-up plate is forced to be closed and is flipped open when the pop-up plate is detached and opened by a predetermined angle with respect to the hinging edge.

The plurality of fastening portions may be provided at four corners thereof corresponding to four corners of the mobile device.

Each of the plurality of fastening portions may comprise an elastic grasping protrusions configured to extend over and hold the corresponding corner of the mobile device.

Each of the plurality of fastening portions may comprise an elevating protrusion for lifting a front surface of the mobile device off a floor.

The pop-up plate may comprise a thumbnail cut-out portion for opening.

The body may further comprise a thumbnail cut-out portion provided next to an edge of the base groove for opening the pop-up plate.

The sound guide groove may be opened to the base groove below an outer surface of the body edge.

The sound guide groove may comprise a tilted groove edge along an edge of the base groove.

The pop-up plate may comprise a tilted plate edge provided at a portion of the plate edge at a location corresponding to the tilted groove edge of the sound guide groove, and the tilted groove edge of the sound guide groove and the tilted plate edge form the blockable sound slit.

Each of the tilted groove edge and the tilted plate edge may be tilted inward.

The pop-up plate may be hinged with the body along the edge of the base groove through a fourth hinge, and the rotational center thereof is located in a middle depth of the base groove, such that the blockable sound slit is opened when the pop-up plate is closed down and closed when the pop-up plate is opened up.

The fourth hinge may be provided at a center of the plate edge.

The wedge-shaped bellow sound amplifier may be disposed with the base groove when folded.

The first and second hinges may be configured to fold in an inward direction only such that the two sub-plates are folded inward only at the third hinge.

The third hinge may be configured to fold in an inward direction only such that the two sub-plates are folded inward only at the first or second hinges.

Each of the first magnets may comprise a bottom metal portion fixed to and embedded in an inner surface of the pop-up plate and a cap metal portion is attached to inner surface of the pop-up plate so as to form a gap inbetween for receiving the magnet.

The body may further comprise a cap metal holder fixed to an outer surface of the base groove of the body so as to receive the cap metal portion of the magnet.

The spring device may comprise a conical coil spring having an apex end and a base end.

The base end may be fixed to the pop-up plate through a spring base holder provided on the inner surface of the pop-up plate, and the apex end is fixed to the body through a spring apex holder provided on the outer surface of the base groove.

The sound-amplifying case may further comprise a limiter and a limiter receptacle.

The limiter is provided on an edge of the base groove for preventing the foldable pan-shaped plate from bending outward.

The limiter receptacle is provided on an inner edge of the pop-up plate for receiving the limiter when the pop-up plate is closed.

The advantages of the present invention are: (1) the case can be applied to mobile devices easily; (2) the case amplifies the sound from the mobile devices; and (3) the sound amplifying device can be operated so as to guide the sound irregardless of the state of opening or closing.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

The U.S. patent application Ser. Nos. 13/403,947 and 13/552,539 are incorporated by reference into this disclosure as if fully set forth herein.

FIGS. 1-38 show sound-amplifying cases and their components according to embodiments of the invention An object of the invention is to provide a sound-amplifying case for a mobile device.

Figure 2:
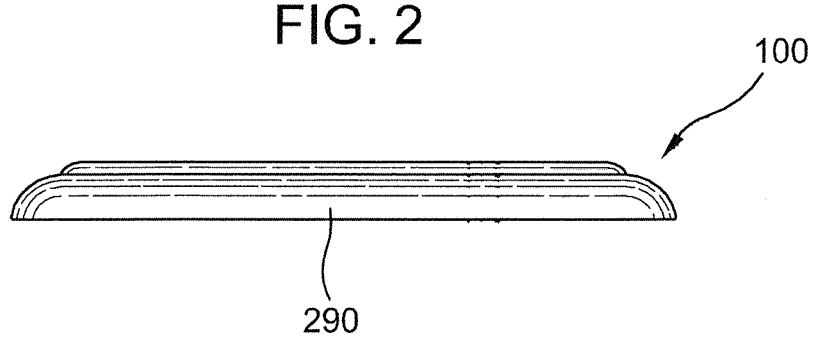
FIG. 2 is a side view showing the sound-amplifying case of FIG. 1.
Figure 3:
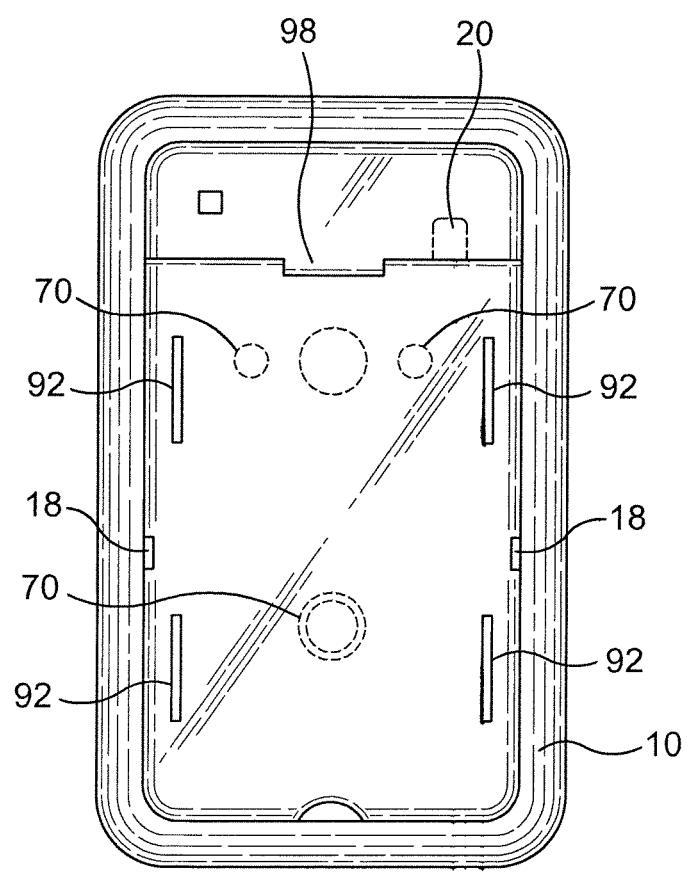
FIG. 3 is a front view showing a sound-amplifying case with a pop-up plate removed according to another embodiment of the invention.

An aspect of the invention provides a sound-amplifying case 100 for a mobile device 290 as shown in FIG. 2.

The case 100 is for the mobile device 290 with its regular parts such as a front face, a rear face, a top edge, a bottom edge, two side edges, and a speaker.

The sound-amplifying case 100 comprises a body 10, a sound guide groove 20, a sound guide hole 30, a pop-up plate 40, a blockable sound slit 50, a wedge-shaped bellow sound amplifier 60, a plurality of first magnets 70, and a spring device 80.

The body 10 is for covering the rear face of the mobile device 290 and comprises a plurality of fastening portions 12

Figure 7:
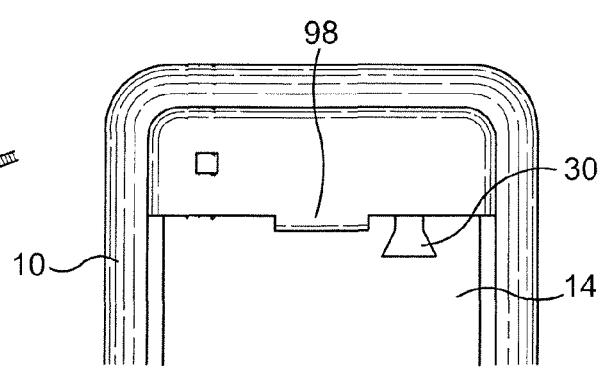
FIG. 7 shows an upper portion of a body of a sound-amplifying case according to another embodiment of the invention.
Figure 8:
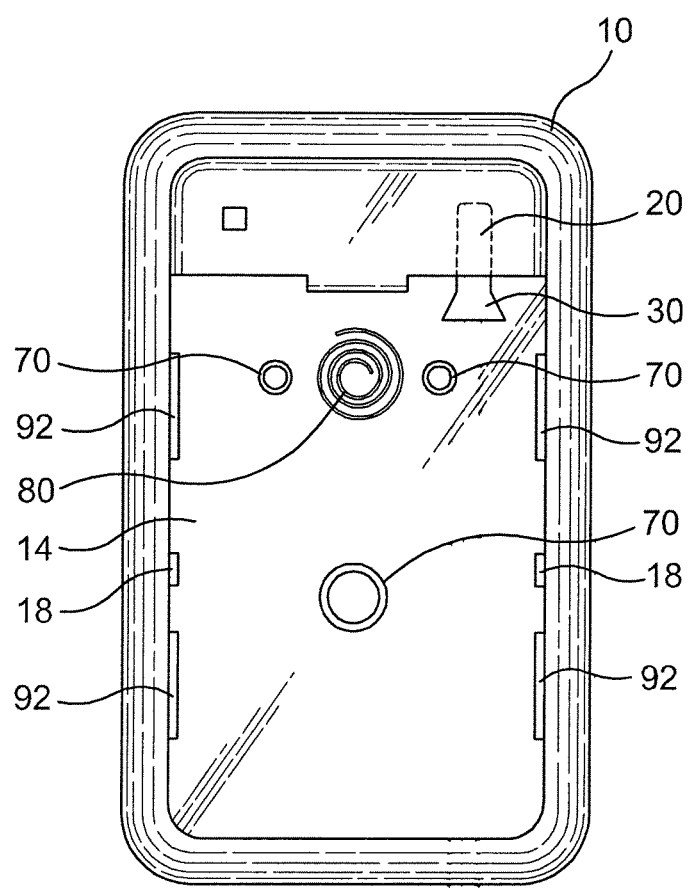
FIG. 8 shows a body of a sound-amplifying case according to another embodiment of the invention.
Figure 9:
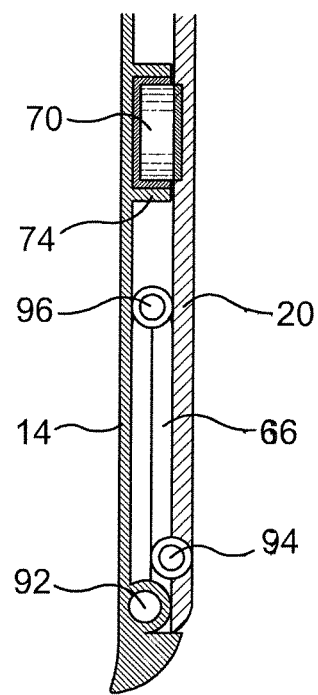
FIG. 9 is a right half cross-sectional view of the sound-amplifying case along line IX-IX in FIG. 1.

(refer to FIG. 35) configured to fasten the mobile device 290, a plurality of utility holes for exposing portions of the mobile device 290, and a base groove 14 (refer to FIGS. 7 and 8).

The sound guide groove 20 (refer to FIGS. 1, 3, 4, 25, 26) is provided under a portion of a body edge 11 of the body 10 and opened over the speaker 292 (refer to FIG. 4) of the mobile device 290 for guiding sound from the speaker 292 toward the pop-up plate 40.

The sound guide hole 30 is provided through a portion of the base groove 14 of the body 10 exposing the speaker 292 of the mobile device 290 to the sound guide groove 20 as shown in FIGS. 7, 8, 25, 26.

The pop-up plate 40 with a plate edge is hinged to a portion of the body 10 substantially along the body edge 11 so as to cover the base groove 14 of the body 10.

The blockable sound slit 50 is provided between the body 10 and the pop-up plate 40 above the sound guide groove 20, and the blockable sound slit 50 is configured to open when the pop-up plate 40 is closed down and to close when the pop-up plate 40 is opened up.

The wedge-shape bellow sound amplifier 60 comprises first and second foldable pan-shaped plates 62, 64, and each of them is installed between corresponding side edge of the base groove 14 of the body 10 and corresponding inner edge of the pop-up plate 40, and each of the first and second foldable pan-shaped plates 62, 64 engages the body 10 through a first hinge 92 and the pop-up plate 40 through a second hinge 94, wherein each of the first and second foldable pan-shaped plates 62, 64 comprises two sub-plates 66 connected to each other through a third hinge 96.

The plurality of first magnets 70 are provided in the pop-up plate 40 for attracting and holding the pop-up plate 40 to the body 10.

The spring device 80 is provided between the pop-up plate 40 and the body 10, configured for opening the wedge-shaped bellow sound amplifier 60 along with the pop-up plate 40.

The plurality of first magnets 70 and the spring device 80 are configured such that the pop-up plate 40 is kept closed when the pop-up plate 40 is forced to be closed and is flipped open when the pop-up plate 40 is detached and opened by a predetermined angle with respect to the hinging edge, which may be from about 12 degrees to about 30 degrees, preferably about 22 degrees.

Figure 34:
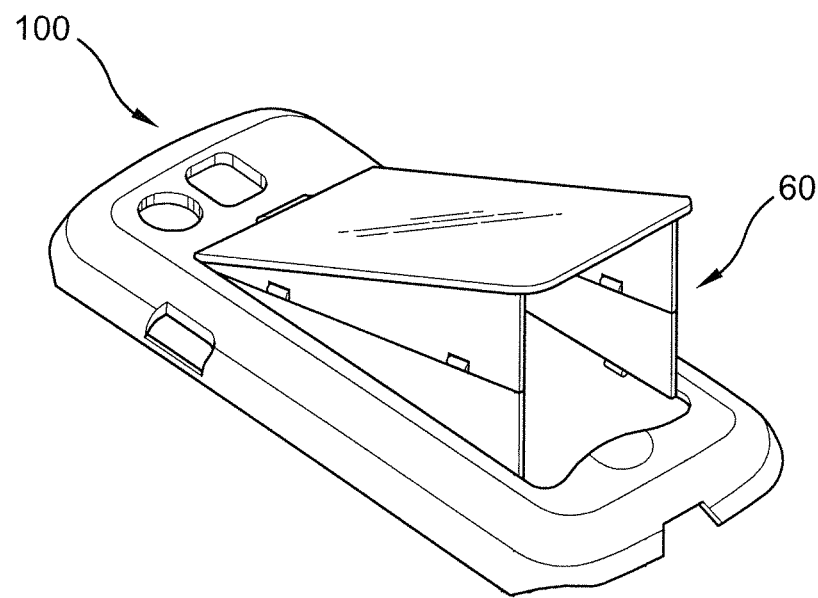
FIG. 34 is a perspective view showing a sound-amplifying case with a pop-up plate opened according to another embodiment of the invention.
Figure 35:
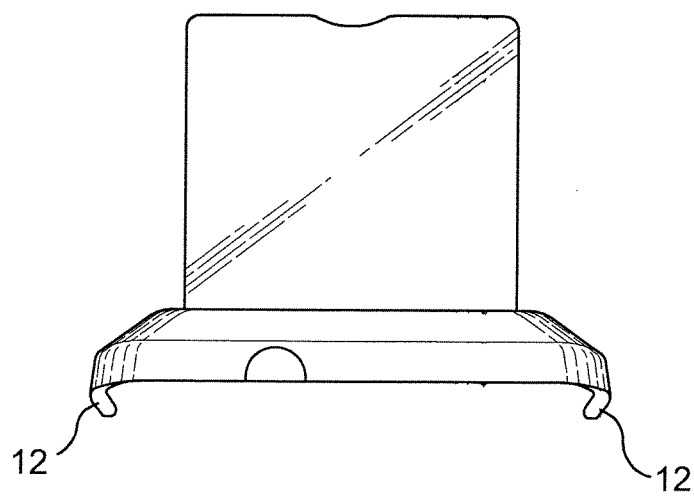
FIG. 35 is a top view showing the sound-amplifying case with a pop-up plate opened of FIG. 34.
Figure 36:
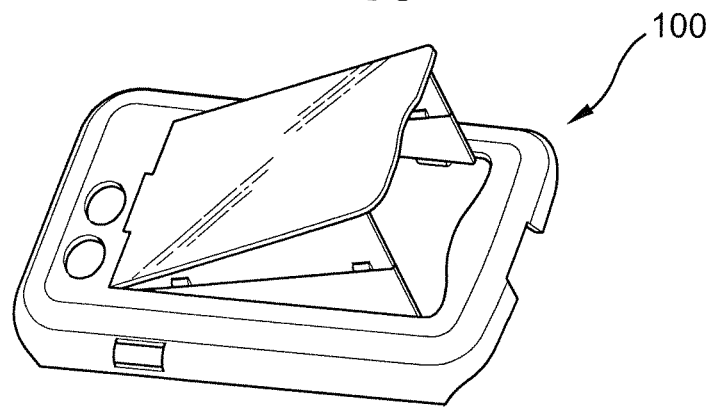
FIG. 36 is a perspective view showing a sound-amplifying case with a pop-up plate opened according to still another embodiment of the invention.
Figure 37:
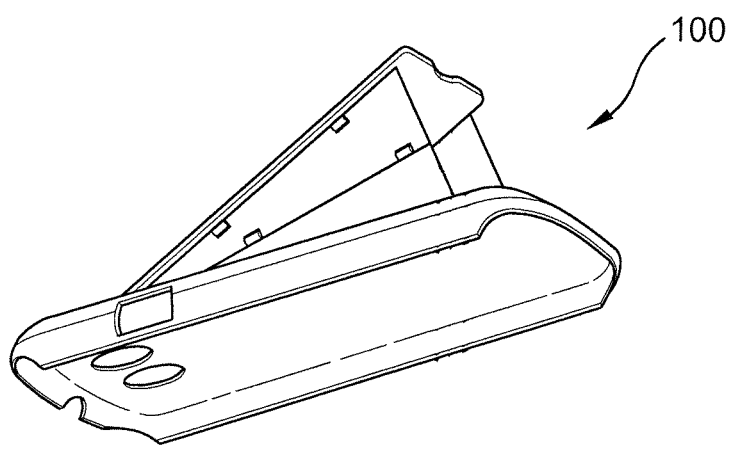
FIG. 37 is a perspective view showing a sound-amplifying case with a pop-up plate opened according to still another embodiment of the invention.
Figure 38:
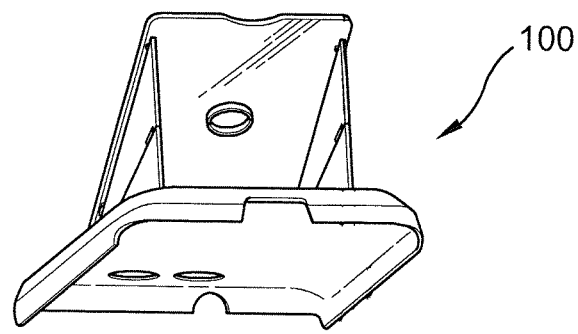
FIG. 38 is a perspective view showing a sound-amplifying case with a pop-up plate opened according to still another embodiment of the invention.

The plurality of fastening portions 12 may be provided at four corners thereof corresponding to four corners of the mobile device 290. Alternatively, the plurality of fastening portions 12 may be provided along four side edges as shown in FIGS. 34 and 35.

Each of the plurality of fastening portions 12 may comprise an elastic grasping protrusions configured to extend over and hold the corresponding corner of the mobile device 290.

Each of the plurality of fastening portions 12 may comprise an elevating protrusion 13 for lifting a front surface of the mobile device 290 off a floor.

The pop-up plate 40 may comprise a thumbnail cut-out portion 42 for opening.

The body 10 may further comprise a thumbnail cut-out portion provided next to an edge of the base groove for opening the pop-up plate 40.

The sound guide groove 20 may be opened to the base groove 14 below an outer surface of the body edge.

Figure 25:
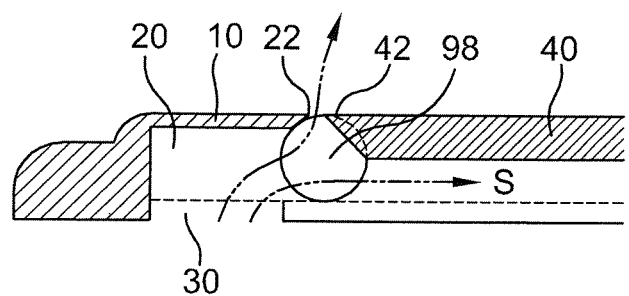
FIG. 25 shows another path of sound when a pop-up plate is closed according to an embodiment of the invention.
Figure 26:
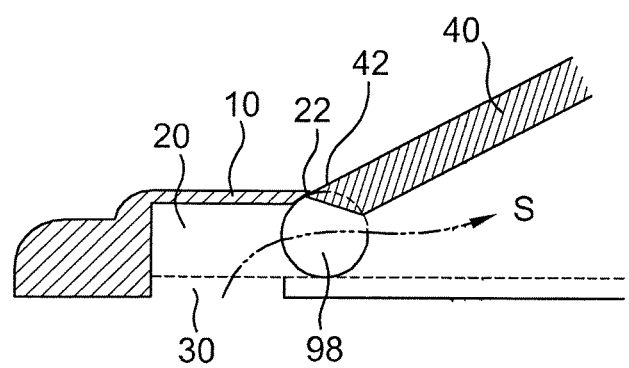
FIG. 26 shows another path of sound when a pop-up plate is opened according to an embodiment of the invention.

The sound guide groove 20 may comprise a tilted groove edge 22 along an edge of the base groove as shown in FIGS. 25 and 26.

The pop-up plate 40 may comprise a tilted plate edge 42 provided at a portion of the plate edge at a location corresponding to the tilted groove edge 22 of the sound guide groove 20, and the tilted groove edge of the sound guide groove 20 and the tilted plate edge 42 form the blockable sound slit 50 as shown in FIGS. 25 and 26.

Each of the tilted groove edge 22 and the tilted plate edge 42 may be tilted inward as shown in FIGS. 25 and 26.

The pop-up plate 40 may be hinged with the body 10 along the edge of the base groove 14 through a fourth hinge 98, and the rotational center thereof is located in a middle depth of the base groove 14, such that the blockable sound slit 50 is opened when the pop-up plate 40 is closed down and closed when the pop-up plate 40 is opened up.

The fourth hinge 98 may be provided at a center of the plate edge.

The wedge-shaped bellow sound amplifier 60 may be disposed with the base groove when folded.

The first and second hinges 92, 94 may be configured to fold in an inward direction only such that the two sub-plates 66 are folded inward only at the third hinge 96.

The third hinge 96 may be configured to fold in an inward direction only such that the two sub-plates 66 are folded inward only at the first or second hinges 92, 94.

Figure 10:
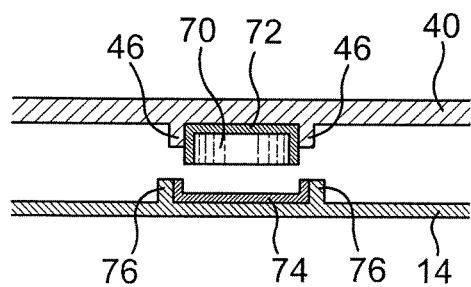
FIG. 10 is a partial cross-sectional view of a magnet according to an embodiment of the invention.
Figure 11:
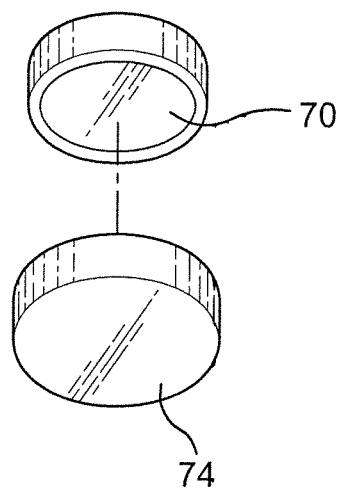
FIG. 11 is a perspective view of a magnet assembly of FIG. 10.
Figure 12:
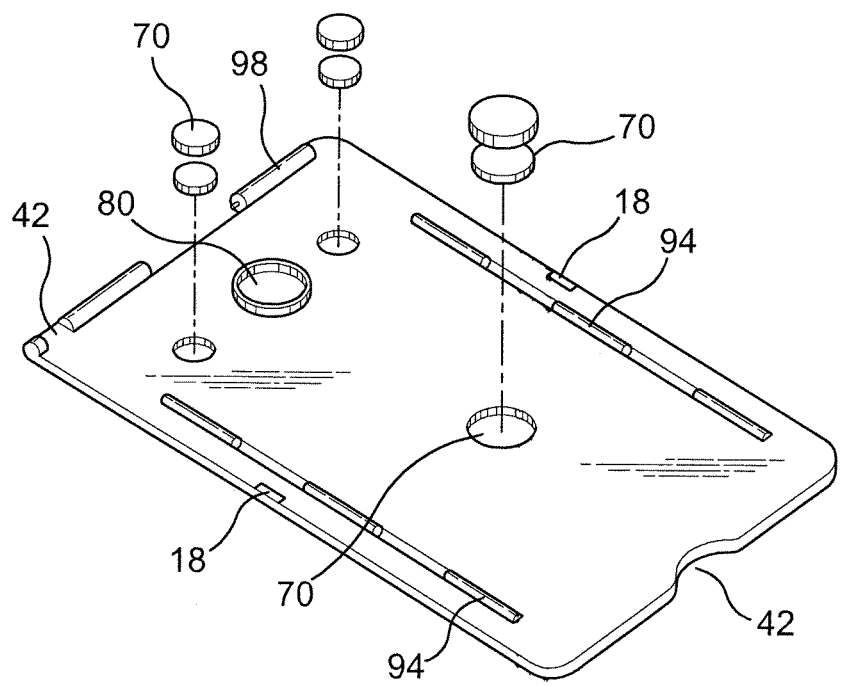
FIG. 12 is a pop-up plate according to an embodiment of the invention.
Figure 13:
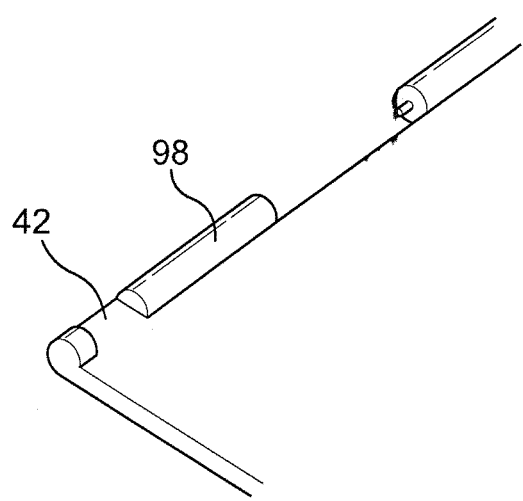
FIG. 13 is a partial perspective view of a fourth hinge according to an embodiment of the invention.
Figure 14:
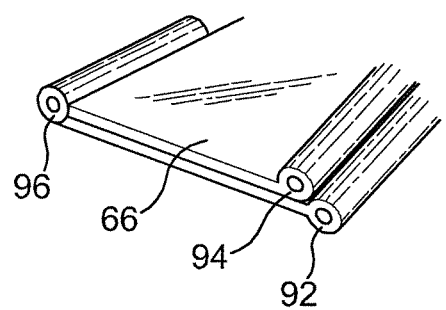
FIG. 14 is a perspective view showing first, second, and third hinges according to an embodiment of the invention.
Figure 15:
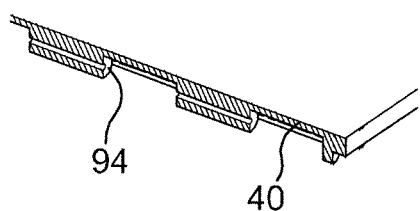
FIG. 15 is a perspective view showing a first portion of the second hinge of FIG. 14.
Figure 16:
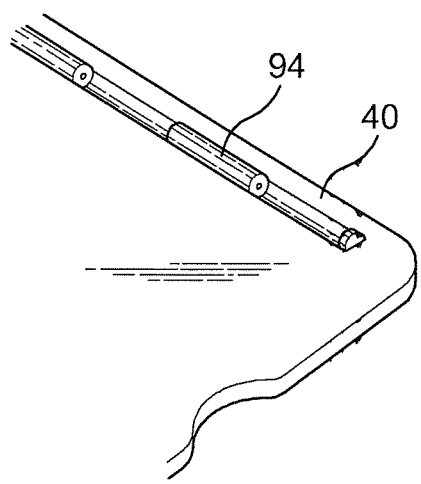
FIG. 16 is a perspective view showing a second portion of the second hinge of FIG. 14.
Figure 17:
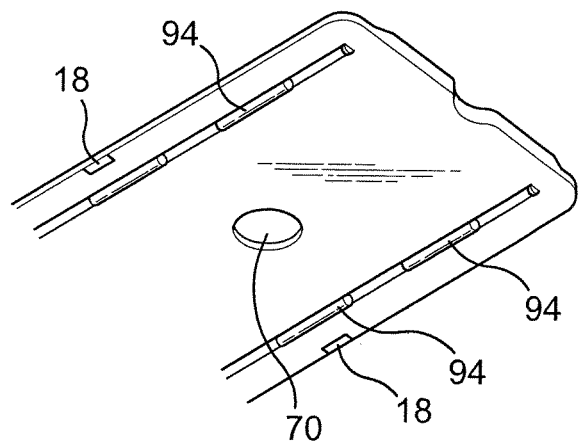
FIG. 17 is a perspective view showing an inner side of a pop-up plate according to an embodiment of the invention.
Figure 18:
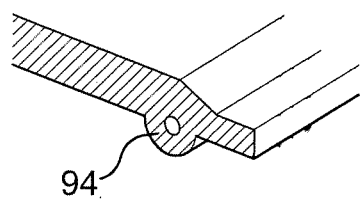
FIG. 18 is a perspective view showing a first hinge part of a second hinge according to an embodiment of the invention.
Figure 19:
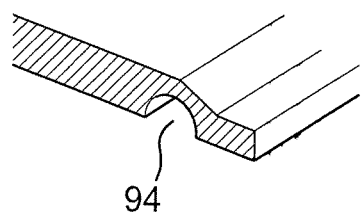
FIG. 19 is a perspective view showing a second hinge part of a second hinge according to an embodiment of the invention.
Figure 20:
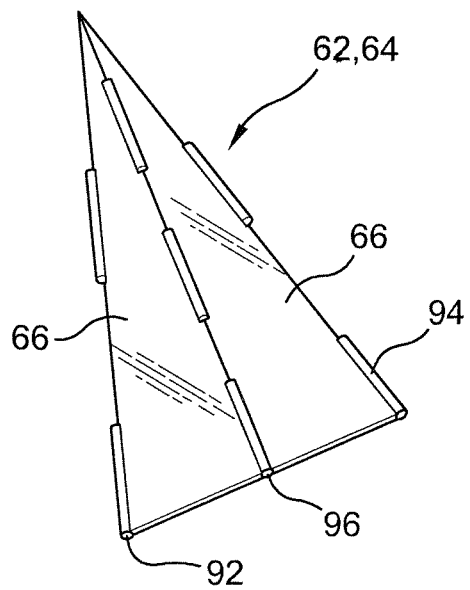
FIG. 20 shows a foldable pan-shaped plate according to an embodiment of the invention.
Figure 21:
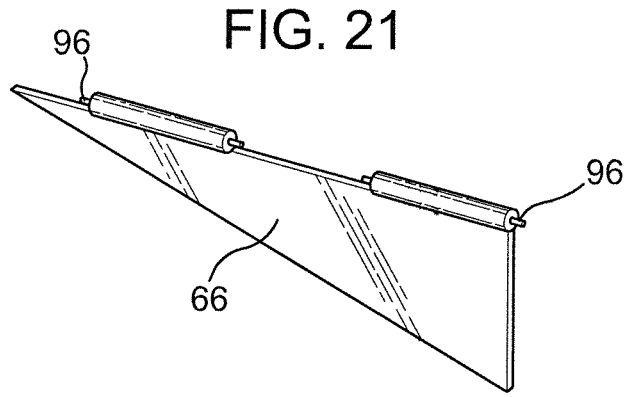
FIG. 21 shows a sub-plate of the foldable pan-shaped plate of FIG. 20.
Figure 22:
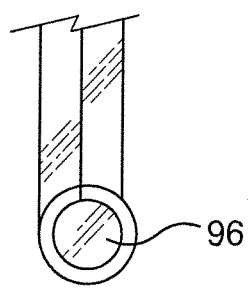
FIG. 22 shows a part of a third hinge according to an embodiment of the invention.

Each of the first magnets 70 may comprise a bottom metal portion 72 fixed to and embedded in an inner surface of the pop-up plate 40 and a cap metal portion 74 is attached to inner surface of the pop-up plate 40 so as to form a gap inbetween for receiving the magnet 70 as shown in FIGS. 10 and 11. The bottom metal portion 72 may be enclosed by a bottom metal holder 46 provided on the inner surface of the pop-up plate 40 as shown in FIG. 10.

The body 10 may further comprise a cap metal holder 76 fixed to an outer surface of the base groove 14 of the body 10 so as to receive the cap metal portion 74 of the magnet 70.

Figure 28:
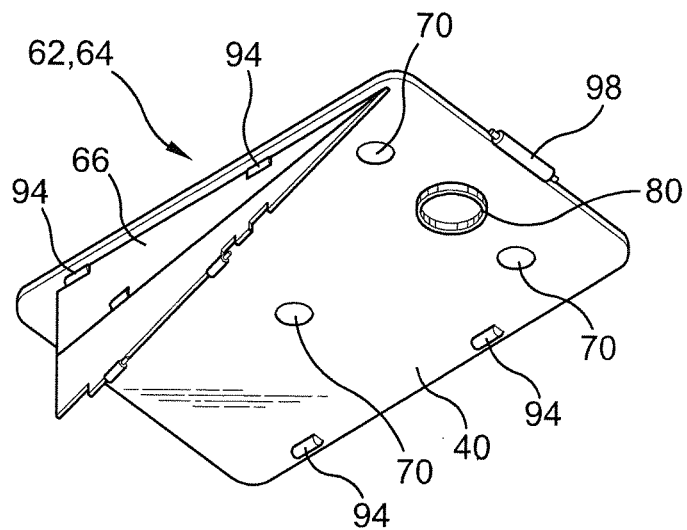
FIG. 28 is a perspective view showing a pop-up plate with a foldable pan-shaped plate assembled according to an embodiment of the invention.
Figure 29:
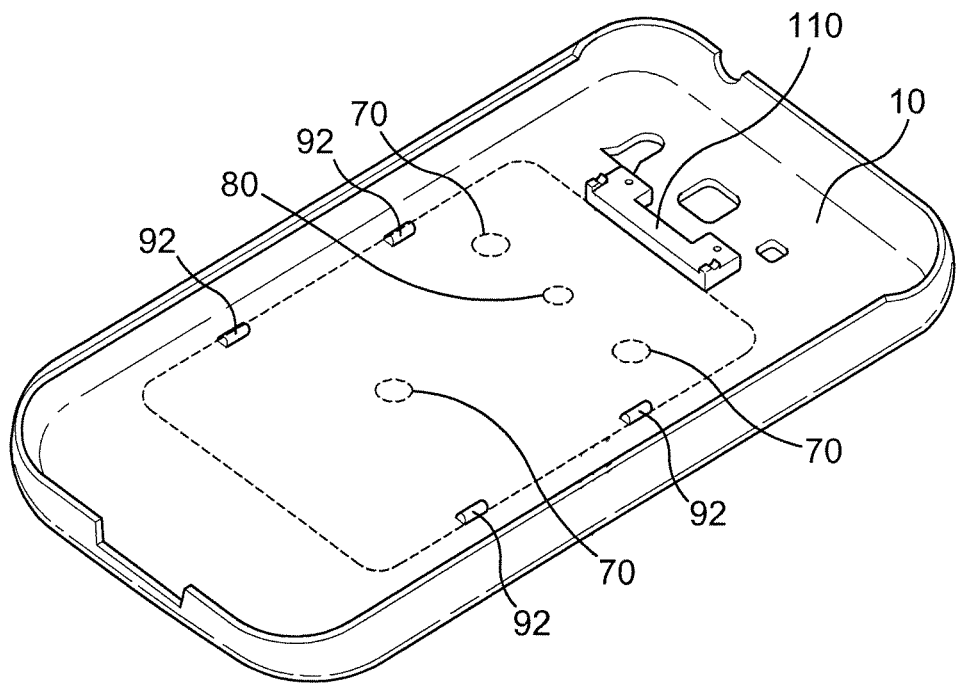
FIG. 29 is a rear view showing a sound-amplifying case with a locking device according to another embodiment of the invention.
Figure 30:
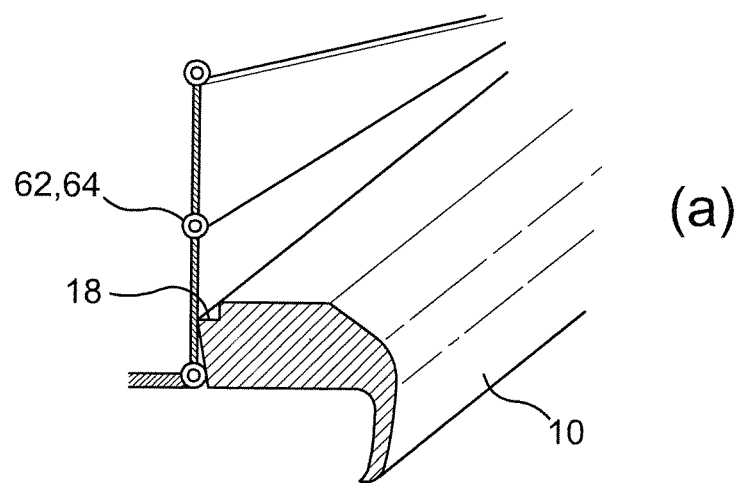
FIGS. 30(a) and (c) are a perspective cross-sectional view showing a foldable pan-shaped plate along with a limiter.
FIG. 30(b) shows a limiter receptacle according to an embodiment of the invention.
Figure 30:
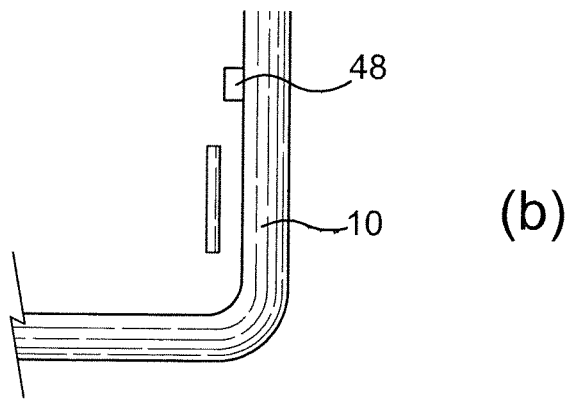
Figure 30:
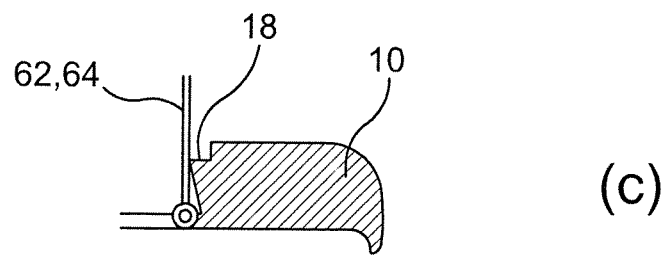
Figure 31:
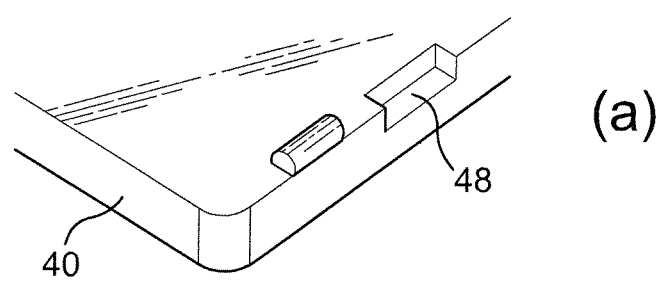
FIGS. 31(a) and (b) show a limiter receptacle of FIG. 30(b)
Figure 31:
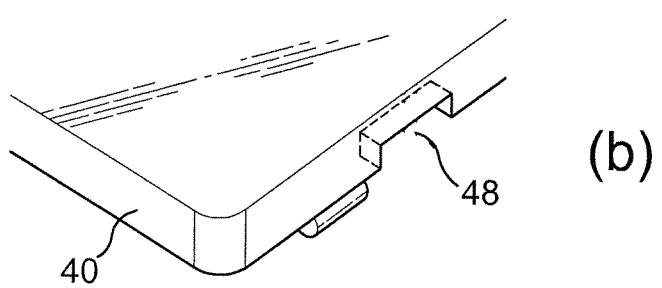
Figure 32:
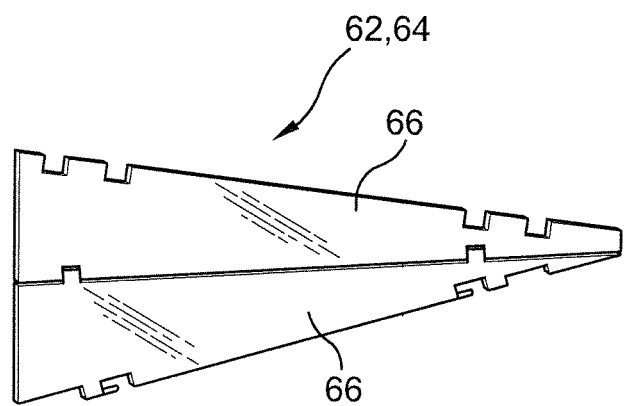
FIG. 32 is a top plan view showing a foldable pan-shaped plate with a third hinge installed according to another embodiment of the invention.
Figure 33:
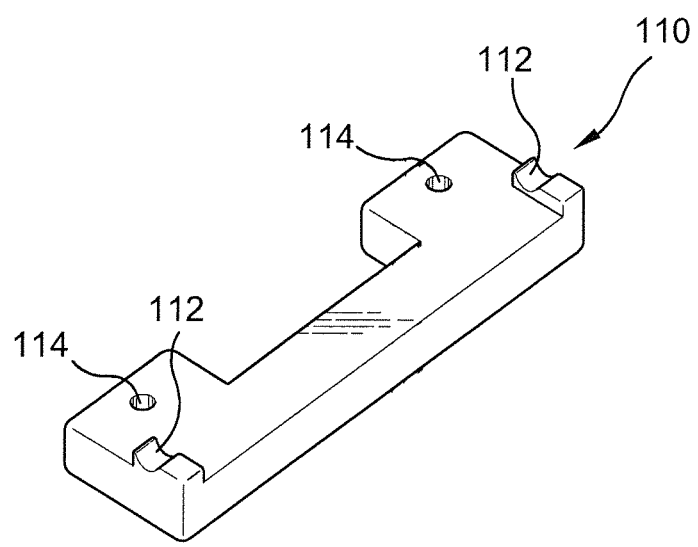
FIG. 33 shows a locking device according to another embodiment of the invention.

The spring device 80 may comprise a conical coil spring having an apex end 80' and a base end 80" as shown in FIGS. 28 and 29.

The base end may be fixed to the pop-up plate 40 through a spring base holder 80''' provided on the inner surface of the pop-up plate 40, and the apex end is fixed to the body 10 through a spring apex holder 80' provided on the outer surface of the base groove 14 as shown in FIGS. 28 and 29.

The sound-amplifying case 100 may further comprise a limiter 18 and a limiter receptacle 48.

The limiter 18 is provided on an edge of the base groove 14 for preventing the foldable pan-shaped plate 62, 64 from bending outward as shown in FIGS. 30(a) and 30(c).

The limiter receptacle 48 is provided on an inner edge of the pop-up plate 40 for receiving the limiter 18 when the pop-up plate 40 is closed as shown in FIGS. 30(B), 31(a), and 31(b).

The limiter 18 and the limiter receptacle 48 are configured to prevent the foldable pan-shaped plate 62, 64 from bending outward.

In certain embodiments of the invention, the sound-amplifying case 100 may further comprise a locking device 110 as shown in FIGS. 29 and 34.

The locking device 110 may include a pair of axle groove 112 and a pair of fasteners 114. The pair of axle groove 112 provides an axle support for the fourth hinge 98. And, the pair of fasteners 114 provide its fastening to the body 10.

Figure 1:
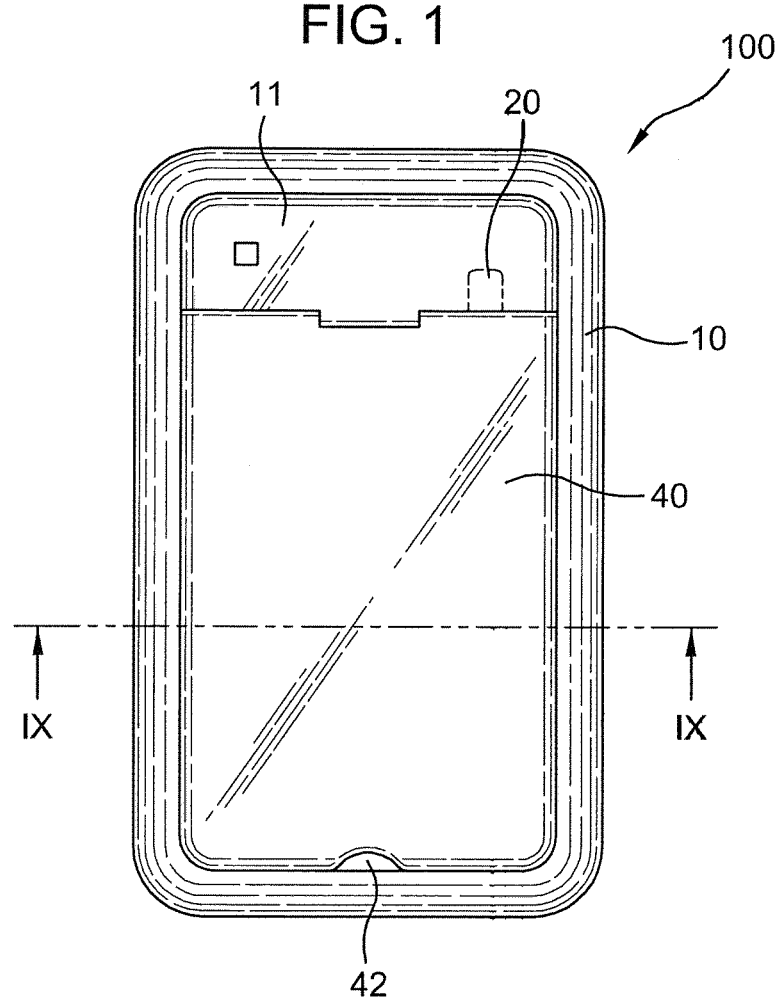
FIG. 1 is a front view showing a sound-amplifying case for a mobile device according to an embodiment of the invention.

Referring to FIG. 1, the sound guide groove 20 may function as a resonance chamber for the sound from the speaker 292 of the mobile device 290 even when the pop-up plate 40 is closed. Therefore, in an embodiment, the blockable sound slit 50 may be omitted.

Referring to FIG. 2, the number and locations of the magnets 70 may be adjusted according to the detailed structure of the case 100. Also, the hinges 92, 94, 96 are not limited to the illustrated ones, but can be of any type of hinges.

Figure 5:
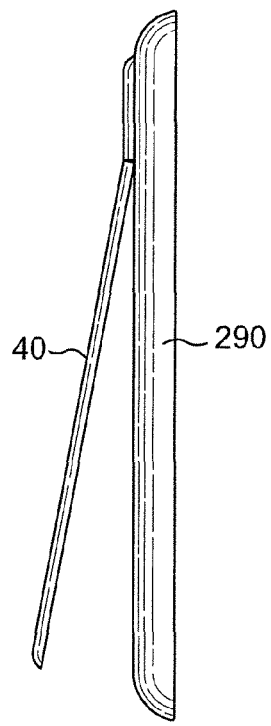
FIG. 5 is a side view of the sound-amplifying case of FIG. 3 with a pop-up plate opened.
Figure 6:
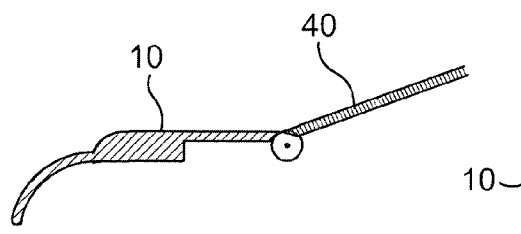
FIG. 6 is a partial cross-sectional view around a fourth hinge in FIG. 5.

Referring to FIG. 5, the foldable pan-shaped plates 62, 64 and the spring device 80 are omitted for emphasis of the pop-up plate 40.

Figure 4:
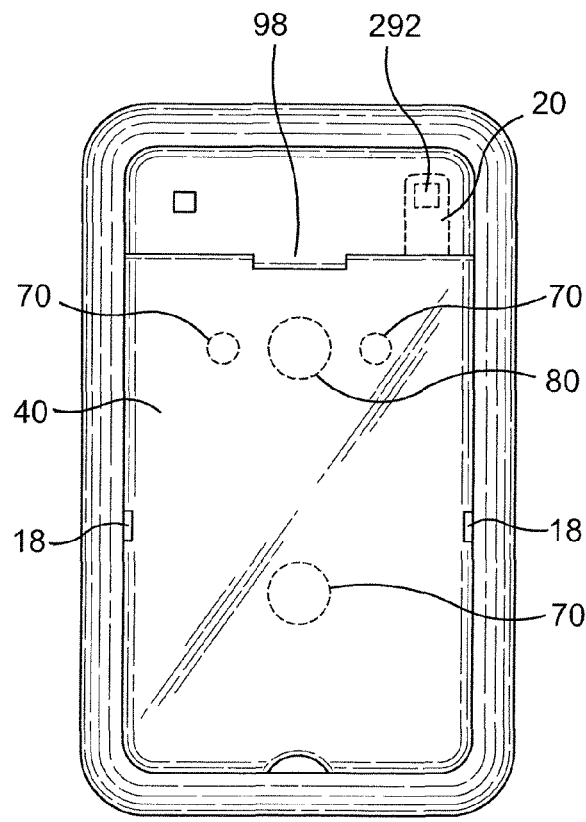
FIG. 4 is a front view showing a sound-amplifying case according to still another embodiment of the invention.

Referring to FIGS. 4 and 7, the shape and the size of the sound guide groove 20 may be similar to that of the sound guide hole 30. Of course, their relative sizes can be adjusted for better performance.

Figure 23:
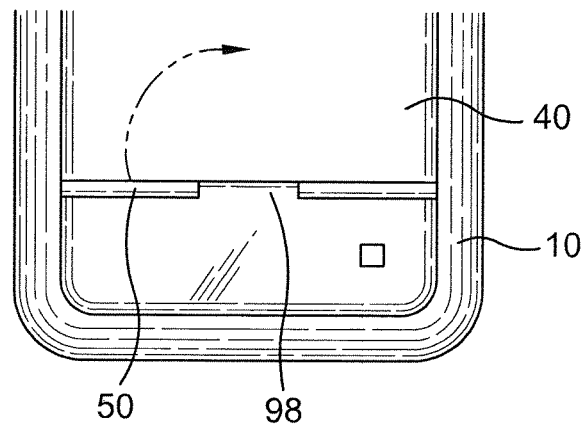
FIG. 23 shows a path of sound when a pop-up plate is closed according to an embodiment of the invention.
Figure 24:
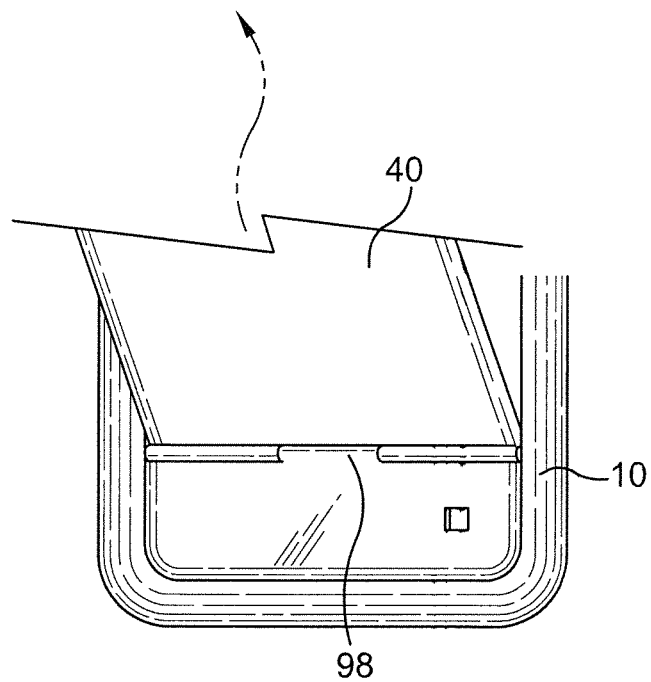
FIG. 24 shows a path of sound when a pop-up plate is opened according to an embodiment of the invention.

Referring to FIGS. 23 and 24, the sound may be guided out from the blockable sound slit 50. However, as discussed in the above, the blockable sound slit 50 may be omitted in certain embodiments. When the pop-up plate 40 is opened, most of the sound is guided through the sound amplifier 60 as illustrated.

Figure 27:
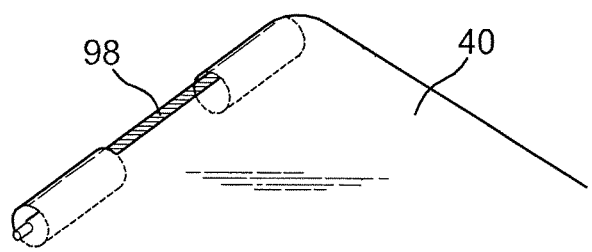
FIG. 27 is a perspective view showing a blockable sound slit when the pop-up plate is closed as in FIG. 25 according to an embodiment of the invention.

Referring to FIGS. 25-27, the blockable sound slit 50 may be provided by find adjusting of the tilted groove edge 22, the tilted plate edge 42, and the fourth hinge 98. The sound path (S) is shown in the figures. Also, the relative locations and shapes and sizes of the sound guide groove 20 and the sound guide hole 30 may be adjusted accordingly, too.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A sound-amplifying case for a mobile device with a front face, a rear face, a top edge, a bottom edge, two side edges, and a speaker, the mobile device case comprising:
    a body for covering the rear face of the mobile device and comprising a plurality of fastening portions configured to fasten the mobile device, a plurality of utility holes for exposing portions of the mobile device, and a base groove;
    a sound guide groove provided under a portion of a body edge of the body and opened over the speaker of the mobile device for guiding sound from the speaker toward the pop-up plate;
    a sound guide hole provided through a portion of the base groove of the body exposing the speaker of the mobile device to the sound guide groove;
    a pop-up plate with a plate edge hinged to a portion of the body substantially along the body edge so as to cover the base groove of the body;
    a wedge-shape bellow sound amplifier with first and second foldable pan-shaped plates, each of which being installed between corresponding side edge of the base groove of the body and corresponding inner edge of the pop-up plate, wherein each of the first and second foldable pan-shaped plates engages the body through a first hinge and the pop-up plate through a second hinge, wherein each of the first and second foldable pan-shaped plates comprises two sub-plates connected to each other through a third hinge;
    a plurality of first magnets provided in the pop-up plate for attracting and holding the pop-up plate to the body; and
    a spring device provided between the pop-up plate and the body, configured for opening the wedge-shaped bellow sound amplifier along with the pop-up plate,
    wherein the plurality of first magnets and the spring device are configured such that the pop-up plate is kept closed when the pop-up plate is forced to be closed and is flipped open when the pop-up plate is detached and opened by a predetermined angle with respect to the hinging edge.

2. The sound-amplifying case of claim 1, wherein the plurality of fastening portions are provided at four corners thereof corresponding to four corners of the mobile device.

3. The sound-amplifying case of claim 2, wherein each of the plurality of fastening portions comprises an elastic grasping protrusions configured to extend over and hold the corresponding corner of the mobile device.

4. The sound-amplifying case of claim 1, wherein each of the plurality of fastening portions comprises an elevating protrusion for lifting a front surface of the mobile device off a floor.

5. The sound-amplifying case of claim 1, wherein the pop-up plate comprises a thumbnail cut-out portion for opening.

6. The sound-amplifying case of claim 1, wherein the body further comprises a thumbnail cut-out portion provided next to an edge of the base groove for opening the pop-up plate.

7. The sound-amplifying case of claim 1, wherein the sound guide groove is opened to the base groove below an outer surface of the body edge.

8. The sound-amplifying case of claim 7, wherein the sound guide groove comprises a tilted groove edge along an edge of the base groove.

9. The sound-amplifying case of claim 8, further comprising a blockable sound slit provided between the body and the pop-up plate above the sound guide groove, wherein the blockable sound slit is configured to open when the pop-up plate is closed down and to close when the pop-up plate is opened up,
    wherein the pop-up plate comprises a tilted plate edge provided at a portion of the plate edge at a location corresponding to the tilted groove edge of the sound guide groove, and wherein the tilted groove edge of the sound guide groove and the tilted plate edge form the blockable sound slit.

10. The sound-amplifying case of claim 9, wherein each of the tilted groove edge and the tilted plate edge is tilted inward.

11. The sound-amplifying case of claim 10, wherein the pop-up plate is hinged with the body along the edge of the base groove through a fourth hinge, the rotational center of which is located in a middle depth of the base groove, such that the blockable sound slit is opened when the pop-up plate is closed down and closed substantially when the pop-up plate is opened up.

12. The sound-amplifying case of claim 11, wherein the fourth hinge is provided at a center of the plate edge.

13. The sound-amplifying case of claim 1, wherein the wedge-shaped bellow sound amplifier is disposed with the base groove when folded.

14. The sound-amplifying case of claim 1, wherein the first and second hinges are configured to fold in an inward direction only such that the two sub-plates are folded inward only at the third hinge.

15. The sound-amplifying case of claim 1, wherein the third hinge is configured to fold in an inward direction only such that the two sub-plates are folded inward only at the first or second hinges.

16. The sound-amplifying case of claim 1, wherein each of the first magnets comprises a bottom metal portion fixed to and embedded in an inner surface of the pop-up plate and a cap metal portion is attached to inner surface of the pop-up plate so as to form a gap inbetween for receiving the magnet.

17. The sound-amplifying case of claim 16, wherein the body further comprises a cap metal holder fixed to an outer surface of the base groove of the body so as to receive the cap metal portion of the magnet.

18. The sound-amplifying case of claim 1, wherein the spring device comprises a conical coil spring having an apex end and a base end.

19. The sound-amplifying case of claim 18, wherein the base end is fixed to the pop-up plate through a spring base holder provided on the inner surface of the pop-up plate, and the apex end is fixed to the body through a spring apex holder provided on the outer surface of the base groove.

20. The sound-amplifying case of claim 1, further comprising:
- a limiter provided on an edge of the base groove for preventing the foldable pan-shaped plate from bending outward; and
- a limiter receptacle provided on an inner edge of the pop-up plate for receiving the limiter when the pop-up plate is closed.

* * * * *